United States Patent [19]

Dragone

[11] Patent Number: 5,450,511
[45] Date of Patent: Sep. 12, 1995

[54] EFFICIENT REFLECTIVE MULTIPLEXER ARRANGEMENT

[75] Inventor: Corrado Dragone, Little Silver, N.J.

[73] Assignee: AT&T Corp., Murray Hill, N.J.

[21] Appl. No.: 279,982

[22] Filed: Jul. 25, 1994

Related U.S. Application Data

[63] Continuation of Ser. No. 875,927, Apr. 29, 1992, abandoned.

[51] Int. Cl.$^6$ ............................................. G02B 6/26
[52] U.S. Cl. ........................................ 385/37; 385/47
[58] Field of Search .................... 385/10, 31, 37, 15, 385/24, 38, 39, 47, 59, 54, 20; 359/115, 117, 124, 130

[56] References Cited

U.S. PATENT DOCUMENTS

| | | | |
|---|---|---|---|
| 3,600,594 | 8/1971 | Moore | 250/227.12 |
| 4,746,186 | 5/1988 | Nicia | 350/96.13 |
| 4,886,333 | 12/1989 | Hicks | 372/6 |
| 4,904,042 | 2/1990 | Dragone | 350/96.16 |
| 4,923,271 | 5/1990 | Henry et al. | 350/96.19 |
| 4,940,306 | 7/1990 | Kitayama et al. | 385/46 |
| 5,002,350 | 3/1991 | Dragone | 350/96.15 |

(List continued on next page.)

FOREIGN PATENT DOCUMENTS

| | | | |
|---|---|---|---|
| 0250824 | 1/1988 | European Pat. Off. | |
| 3-263003 | 11/1991 | Japan | 385/37 |

OTHER PUBLICATIONS

"10 GHz Spacing Optical Frequency Division Multiplexer Based on Arrayed-Waveguide Grating," H. Takahasi, et al.

(List continued on next page.)

Primary Examiner—Rodney B. Bovernick
Assistant Examiner—John Ngo
Attorney, Agent, or Firm—Eugene S. Indyk

[57] ABSTRACT

The efficiency and freedom from cross-talk achieved by transmissive multiplexer/demultiplexer devices is achieved in a reflective multiplexer/demultiplexer device. The reflective geometry avoids the large size devices necessitated by transmissive geometries handling a large number of optical channels. The reflective geometry also avoids long bends in waveguides used in optical gratings in high efficiency transmissive geometries. Integrated optical multiplexers/demultiplexers in accordance with this invention comprise a plurality of waveguides for carrying unmultiplexed optical signals interleaved with a plurality of waveguides for carrying multiplexed optical signals. The two pluralities of waveguides are connected to the boundary of a free space region. The pluralities of waveguides communicate through the free space region with an optical grating comprising a plurality of waveguides each terminated in a reflective element. The length of each waveguide in the grating differs from the lengths of adjacent waveguides in the grating by a predetermined amount to introduce predetermined path length differences for the optical signals traveling in the waveguides of the grating. Unmultiplexed optical signals, introduced into one or more of the input waveguides for carrying unmultiplexed optical signals, travel through those waveguides into the optical grating and are reflected towards one or more of the output waveguides for carrying multiplexed optical signals. When the device is used as a multiplexer in this fashion, it causes the optical signals introduced into the device to be multiplexed together and appear in a predetermined one or more of the waveguides for carrying multiplexed signals. Multiplexed optical signals introduced into one or more of the waveguides for carrying multiplexed signals are directed through the free space region to the optical grating and are reflected toward one or more of the output waveguides for carrying unmultiplexed optical signals. When the device is used as a demultiplexer in this manner, input signals which comprise a mixture of optical frequencies are demultiplexed so that the individual optical frequencies are separated from one another and appear at one or more predetermined waveguides for carrying unmultiplexed optical signals.

10 Claims, 3 Drawing Sheets

U.S. PATENT DOCUMENTS 5,136,600  8/1992  Fidric et al. ............................ 372/6
5,142,660  8/1992  Cheng et al. ........................... 385/10

OTHER PUBLICATIONS

"New Focusing and Dispersive Planar Component Based on an Optical Phased Array", M. K. Smit, Electronics Letters, vol. 24, No. 7, Mar. 31, 1988, pp. 385–386.

"Wavelength Division Multiplexing in Optical Fibre Sensor Systems and Networks: a Review," J. M. Senior, S. D. Cusworth, Optics and Laser Technology, vol. 22, No. 2, Apr. 1990, pp. 113–126.

C. Dragone, "An N×N Optical Multiplexer Using a Planar Arrangement of Two Star Couplers," IEEE Photonics Tech. Letters, vol. 3, No. 9, Sep. 1991, pp. 812–815.

C. Cremer et al., "Grating spectrograph in InGaAsP/InP for dense wavelength division multiplexing," Appl. Phys. Lett., 59 (6), Aug. 5, 1991, pp. 627–629.

C. Dragone et al., "Integrated Optics N×N Multiplexer on Silicon," IEEE Photonics Tech. Letters, vol. 3, No. 10, Oct. 1991, pp. 896–899.

J. B. D. Soole et al., "Menolithic InP-Based Grating Sepctrometer for Wavelength–Division Multiplexes Systems at 1.5 $\mu$m," Electronics Letters, vol. 27, No. 2, Jan. 17, 1991, pp. 132–134.

J. B. D. Soole, et al., "Monolithic InP/InGaAsP/InP grating spectrometer for the 1.48–1.56 $\mu$m wavelength range," Appl. Phys. Lett. 58 (18), May 6, 1991, pp. 1949–1951.

A. R. Vellekoop et al., "Four-Channel Integrated-Optic Wavelength Demultiplexer With Weak Polarization Dependence," Jour. of Lightwave Tech., vol. 9, No. 3, Mar. 1991, pp. 310–314.

H. Takahashi et al., "Arrayed-Waveguide Grating For Wavelength Divisin Multi/Demultiplexer With Nanometre Resolution," Electronics Letters, vol. 26, No. 2, Jan. 18, 1990, pp. 87–88.

BRAGG REFLECTORS

BRAGG REFLECTORS

EFFICIENT REFLECTIVE MULTIPLEXER ARRANGEMENT

This application is a continuation of application Ser. No. 07/875,927, filed on Apr. 29, 1992 now abandoned.

TECHNICAL FIELD

This invention relates to optical multiplexing and demultiplexing. More specifically, this invention relates to reflective optical multiplexing and demultiplexing devices. Those devices comprise small integrated structures which are highly efficient and can handle a large number of communications channels without a large amount of cross-talk between channels.

BACKGROUND

Efficient optical multiplexers and demultiplexers suitable for long haul and local area communications networks can be realized in integrated form. See, for example, U.S. Pat. No. 5,002,350. These efficient multiplexers and demultiplexers comprise a plurality of essentially uncoupled transmissive waveguides which effectively provide unequal path lengths between a group of input waveguides and a group of output wave guides. The unequal length waveguides essentially act as a grating whose order is determined by the difference in path length between the adjacent waveguides.

The size of multiplexer/demultiplexer devices using such transmissive waveguides to perform the function of an optical grating tends to be large. The size of these transmissive devices may, in fact, be too large to be practical, especially when the number of channels handled by the device is large, the required level of cross-talk between channels is very low, and the channel width is small. This large size is due, in part, to the long bends needed in the grating to produce the required path length differences in the grating. To maintain low levels of cross-talk between adjacent ports of the device, the spacing between waveguides must be relatively large—for example, more than twice the width of each waveguide—which requires a further increase in the size of the device. Large size is disadvantageous in itself because too much precious space is used and miniaturized devices for a communication system become harder to achieve. Also, in large integrated devices, unavoidable compositional variations in the materials making up those devices become more noticeable and thus have an increasingly deleterious effect on performance in larger devices. In the case of the multiplexing and demultiplexing device described above, compositional variations cause variations in the propagation constant of the waveguides. Changes in the propagation constant will cause phase errors in the optical signals flowing in the waveguides. Such phase errors will noticeably increase the cross-talk between channels in a large size multiplexing and demultiplexing device and will seriously reduce the efficiency of the device.

SUMMARY

The size of a multiplexer/demultiplexer device, and the resultant problems caused by large size, may be reduced by adopting a reflective geometry in place of a transmissive geometry like the prior art geometry described above. High efficiency and low levels of cross-talk achieved by transmissive geometries are maintained. Also, a large number of channels may be multiplexed or demultiplexed by such a small size reflective device.

In one example of the invention, a first plurality of waveguides is connected to a free space region. The first plurality of waveguides may comprise a group of waveguides which may carry input optical signals interleaved with a group of waveguides which may carry output optical signals. A second plurality of waveguides is also connected to the free space region. Each of the second plurality of waveguides is terminated with a reflective element. Advantageously, such a reflective device can be smaller than a corresponding transmissive device for a given number of channels handled by the device.

DETAILED DESCRIPTION

Figure 1:
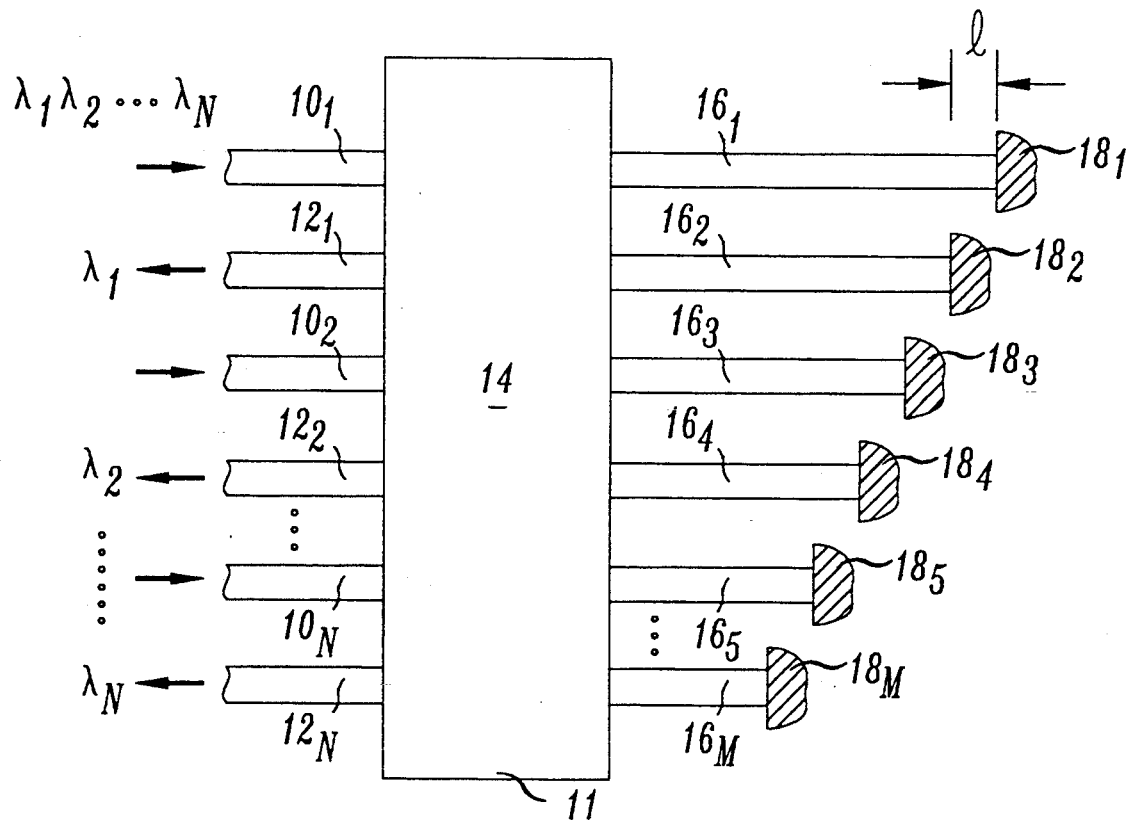
FIG. 1 is a schematic representation of an integrated multiplexer/demultiplexer in accordance with this invention which uses a reflective optical grating containing waveguides terminated with reflective elements.

FIG. 1 shows an optical multiplexer/demultiplexer which comprises a plurality of input ports and a plurality of output ports. An optical grating couples the input ports to the output ports and comprises a plurality of waveguides terminated in reflective elements. More specifically, FIG. 1 schematically shows an example of a reflective optical N×N multiplexer/demultiplexer in accordance with this invention. The device of FIG. 1 comprises a group of N input waveguides $10_1$, $10_2$, . . . , and $10_N$ one or more of which each may carry up to N optical signals which have been multiplexed together by some instrumentality external to the device of FIG. 1. N may be up to 20 or more. These multiplexed optical signals are directed into the device for demultiplexing via waveguides $10_1$, $10_2$, . . . , and $10_N$, which act as input ports of the device, when the device is used as a demultiplexer for these signals. The device demultiplexes the multiplexed optical signals received on each one of the input ports. The demultiplexed optical signals are directed out of the device via a second group of N output waveguides $12_1$, $12_2$, . . . , and $12_N$, which act as output ports of the device when waveguides $10_1$, $10_2$, . . . , and $10_N$ are used as input ports. Alternatively, a plurality of the waveguides $12_1$, $12_2$, . . . , and $12_N$ each may carry a single wavelength optical input signal. Those single optical input signals are multiplexed by the device of FIG. 1 and directed out of the device on one of the waveguides $10_1, 10_2, \ldots, 10_N$. In this case, the waveguides $12_1, 12_2, \ldots,$ and $12_N$ act as the input ports of the device and waveguides $10_1, 10_2, \ldots,$ and $10_N$ act as output ports of the device.

In both cases, the output waveguides are interleaved with the input waveguides so that every other waveguide connected to the boundary 11 of the free space region 14 is a waveguide for carrying input signals and every other waveguide connected to boundary 11 is a waveguide for carrying output signals. As in the case of the input waveguides, N may be up to 20 or more for the output waveguides. Although described as being equal in number here, the number of input waveguides may differ from the number of output waveguides.

The device of FIG. 1 also comprises a planar free space region 14 connected to the pluralities of waveguides 10 and 12. The free space region 14 is also connected to an optical reflective grating comprising M unequal length waveguides $16_1, 16_2, 16_3, 16_4, 16_5, \ldots,$ and $16_M$. The length of each waveguide in the grating differs from its immediately adjacent neighboring waveguides by a constant predetermined magnitude l, as shown in FIG. 1. One end of each of the waveguides 16 in the grating is connected to the free space region 14. The other end of each of the waveguides 16 is terminated in reflective elements $18_1, 18_2, 18_3, 18_4, 18_5, \ldots,$ and $18_M$, respectively. M may be up to 35 or more.

The device of FIG. 1 may be fabricated from a silicon wafer by forming regions of $SiO_2$ in the wafer defining the configurations of the waveguides and free space region. The formation of such regions may be made by photolithographic patterning techniques. The reflective elements 18 may be formed by creating appropriate reflective compositional discontinuities in the waveguides 18 in the grating. An alternative material which may be used to form the device of FIG. 1 comprises semiconductor material such as indium phosphide (InP) having regions of a quaternary composition, such as InP doped with gallium arsenide InGaAsP, defining the waveguides and free space region shown in FIG. 1.

FIG. 1 illustrates one example of the use of the illustrated device as a demultiplexer for input signals in waveguide $10_1$. As shown in FIG. 1, a plurality of optical wavelengths $\lambda_1, \lambda_2, \ldots \lambda_N$ are directed toward the free space region 14 via the waveguide $10_1$. The wavelengths $\lambda_1, \lambda_2, \ldots \lambda_N$ travel through the waveguide $10_1$, into the free space region 14, and illuminate the optical grating. Some of the energy received from waveguide $10_1$ is directed through each of the waveguides $16_1, 16_2 \ldots,$ and $16_M$ in the grating toward a respective one of the reflective elements $18_1, 18_2, \ldots,$ or $18_M$. The energy flowing in each of the waveguides 16 is reflected from a respective reflective element back toward the free space region 14. Due to the fact that each of the waveguides 16 differs in length from its immediately adjacent neighboring waveguide in the optical grating by an amount l, as shown in FIG. 1, there is a corresponding phase shift between the reflected energy directed into the free space region 14 by each of the waveguides 16. This phase shift causes each individual optical wavelength in the original multiplexed signal introduced into the device on waveguide $10_1$ to be focused or concentrated on different ones of the waveguides $12_1, 12_2 \ldots,$ and $12_N$ for carrying demultiplexed optical wavelengths. In the example of FIG. 1, the optical energy at wavelength $\lambda_1$ is directed out of the device on waveguide $12_1$, optical energy at wavelength $\lambda_2$ is directed out of the device on waveguide $12_2$, and so forth up to optical energy at $\lambda_N$ being directed out of the device on waveguide $12_N$. Those skilled in the art will appreciate that multiplexed optical signals may also be applied simultaneously or separately to the other waveguides $10_2$ to $10_N$ in addition to waveguide $10_1$. Those signals will be demultiplexed and directed to individual ones of the waveguides $12_1, 12_2, \ldots,$ and $12_N$. For example, the same wavelengths $\lambda_1, \lambda_2, \ldots,$ and $\lambda_N$ may be directed to any of the other waveguides $10_2$ to $10_N$. Each individual wavelength will be demultiplexed and will appear as an output on one of the waveguides $12_1, 12_2 \ldots,$ and $12_N$. The waveguide $12_1, 12_2, \ldots,$ and $12_N$ on which a particular wavelength appears is a function of which waveguide $10_1, 10_2, \ldots,$ or $10_N$ received that wavelength.

The device of FIG. 1 may also perform as a multiplexer, since each output waveguide in general may receive signals from all input waveguides. Thus, by directing optical wavelengths $\lambda_1, \lambda_2, \ldots,$ and $\lambda_N$ into the device on waveguides $12_1, 12_2 \ldots$ and $12_N$, respectively, those input optical wavelengths will be multiplexed by the device and appear in combination at the output of the device on one of the waveguides $10_1, 10_2, \ldots,$ and $10_N$. Those skilled in the art will appreciate that the identity of a waveguide at which a desired unmultiplexed or multiplexed optical wavelength appears as an output is determined by the wavelength of an input signal and by which of the input waveguides receives input optical wavelength for demultiplexing or multiplexing.

Figure 2:
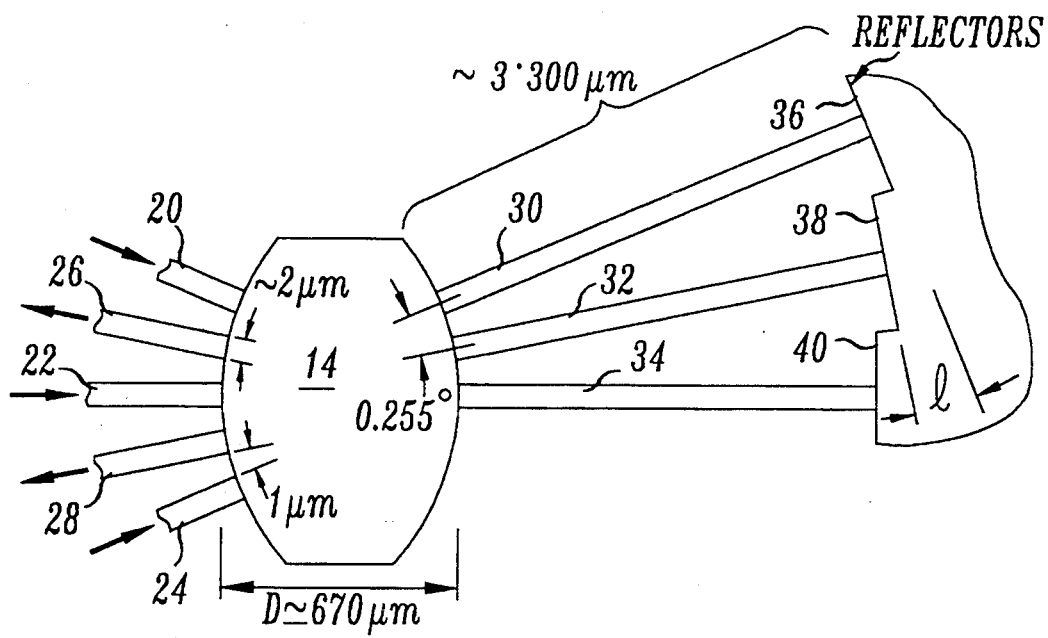
FIG. 2 is a more detailed representation of an example of a reflective multiplexer/demultiplexer in accordance with this invention.

FIG. 2 shows a more detailed example of an integrated optical multiplexing/demultiplexing device in accordance with this invention. The device of FIG. 2 comprises waveguides and a planar free space region made of InGaAsP regions formed on or in an InP substrate. The device of FIG. 2 may be an N×N multiplexer capable of multiplexing and demultiplexing N optical wavelengths, where N may be as large as 16 or more. As in the device of FIG. 1, the device of FIG. 2 contains a plurality of waveguides. The plurality of waveguides comprises N waveguides for carrying input optical signals. Three of those waveguides for carrying input optical signals are labeled with reference numerals 20, 22, and 24 in FIG. 2. The plurality of waveguides also comprises N waveguides for carrying output optical signals. Two of the waveguides for carrying output optical signals are labeled with reference numerals 26 and 28 in FIG. 2. As in the case of the device of FIG. 1, the device of FIG. 2 also comprises a free space region 14 connected to one end of each of the waveguides described above. The free space region 14 may comprise a flat area having a length D of about 670 $\mu$m. The waveguides described above may be about 2 $\mu$m wide. The waveguides may be separated by about 1 $\mu$m at the circular boundary of the free space region 14. The wavelength channels $\lambda_1, \lambda_2, \ldots, \lambda_N$ handled by the device of FIG. 2 may be separated by about 0.8 nanometers. $\lambda_1$ may be about 1.5 $\mu$m.

In addition to the waveguides 20, 22, 24, 26, and 28, the device of FIG. 2 contains an optical grating comprising M waveguides, three of which are labeled in FIG. 2 with reference numerals 30, 32, and 34. The value of M may be about 35 in one example of the invention. The M waveguides in the grating are of unequal length. Specifically, the length of each waveguide in the grating differs from the length of its immediately adjacent waveguides in the grating by a constant length l. More specifically, for the waveguides shown in FIG. 2, the length of waveguide 30 is l units of length longer than the length of waveguide 32. Waveguide 32, in turn, is l units of length longer than waveguide 34. In one example of the invention, the value of l may be about 75 μm. Each of the waveguides in the grating may be separated from its immediate neighbors by an angular separation of about 0.255°. The length of the longest waveguide in the optical grating may be about 3300 μm. Each of the waveguides in the grating is terminated with a reflective element as in FIG. 1. Specifically, for the waveguides shown in FIG. 2, waveguide 30 is terminated in a reflective element 36, waveguide 32 is terminated in a reflective element 38, and waveguide 34 is terminated in a reflective element 40. The device of FIG. 2 operates in a fashion similar to the device of FIG. 1 to multiplex and demultiplex optical signals directed to selected ones of the waveguides for carrying multiplexed and unmultiplexed signals described above.

The grating of FIG. 2 has an important advantage in that variable phase shifters, for example, a modulator using the electroptic effect, may be located in each of the grating arms to obtain a tunable grating. In this situation, phase errors caused by nonuniformity in the wafer and other phase aberrations can be removed thus reducing cross-talk in the device.

Figure 3:
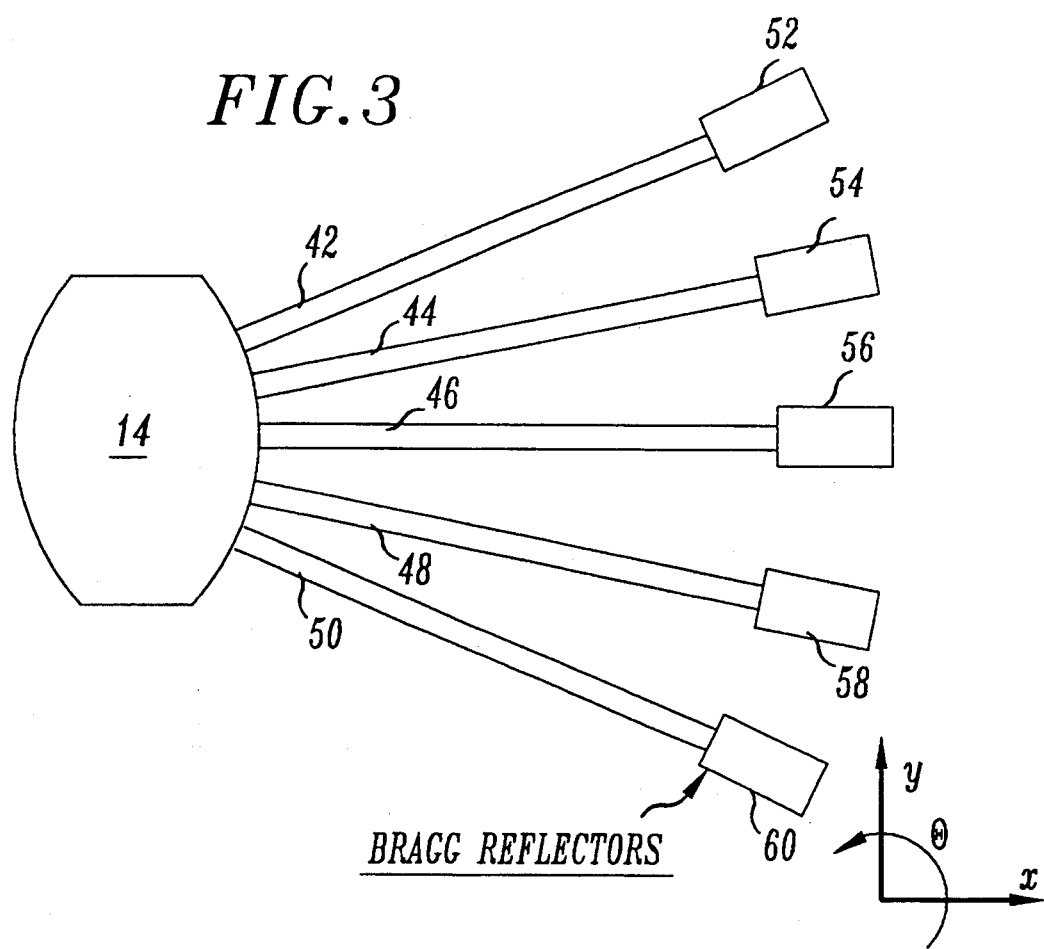
FIG. 3 shows an example of an optical grating in accordance with this invention comprising straight waveguides terminated in Bragg reflectors.
Figure 4:
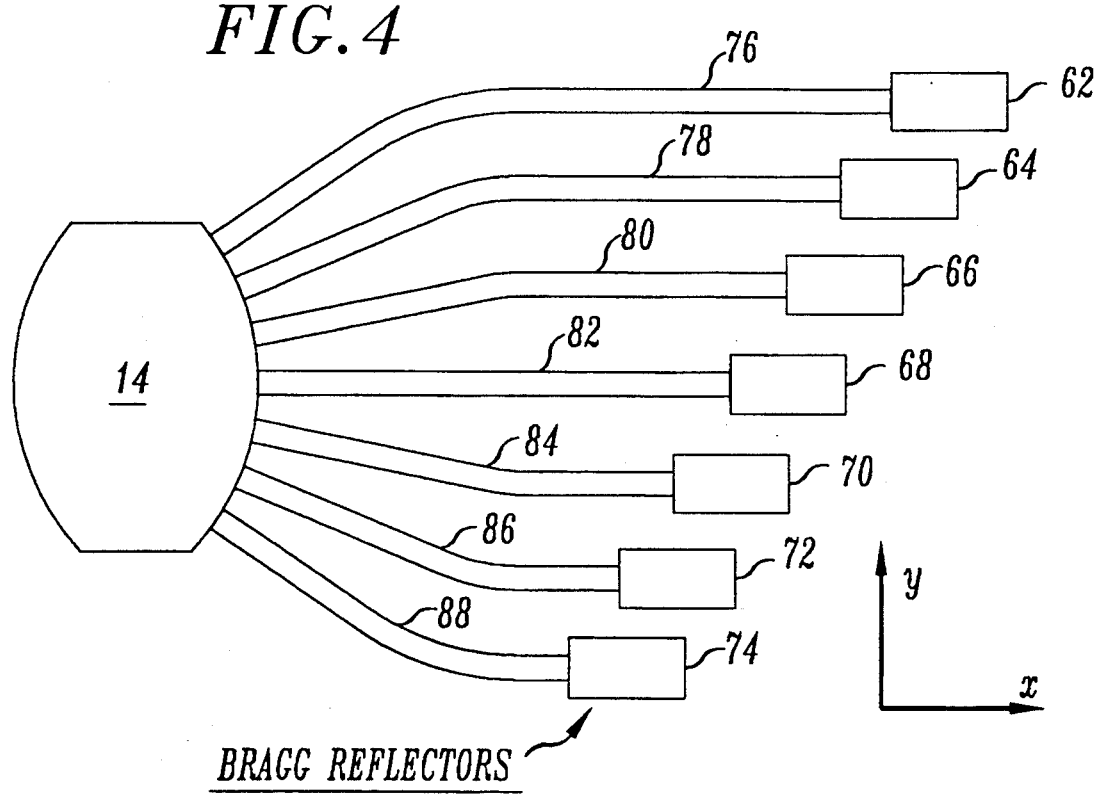
FIG. 4 shows an example of an optical grating in accordance with this invention comprising curved waveguides terminated in Bragg reflectors which are located so that they are displaced from one another by only x and y linear displacements.

FIGS. 3 and 4 show two embodiments of the invention using Bragg reflectors as the reflecting elements. The Bragg reflectors may be formed in the wafer at the end of each waveguide in the grating by forming a number of closely spaced grooves in the wafer which act as a reflecting grating. The advantage of using Bragg reflectors in this manner is that when each Bragg reflector is appropriately situated with respect to the optical energy flowing in its respective waveguide, the losses due to reflection can be very small, for example, less than 1 dB. In FIG. 3 the grating waveguides 42, 44, 46, 48, and 50 are each unequal length straight-line waveguides extending from the free space region 14 to Bragg reflectors 52, 54, 56, 58, and 60, each of which is appropriately oriented with respect to the longitudinal axis of its respective waveguide so that maximum reflection of the incident optical energy occurs. The Bragg reflectors shown in FIG. 3 are thus linearly displaced from one another in both the x,y directions in the plane of the wafer and are also rotationally displaced with respect to one another and equally spaced. It may thus be somewhat difficult to fabricate the geometry of FIG. 3 using stepping equipment which must individually form the Bragg reflectors in the wafer. In a situation where stepping equipment must be used, it may be desirable to use the geometry of FIG. 4 which depicts the Bragg reflectors 62, 64, 66, 68, 70, 72, and 74 which are only linearly displaced from one another in the x,y plane without any rotational displacement. This arrangement of Bragg reflectors requires that the grating waveguides 76, 78, 80, 82, 84, 86, and 88 terminated by the Bragg reflectors to be somewhat curved, but this curvature is not too severe, the bends in the waveguides are not too long, and little appreciable loss is introduced.

Figure 5:
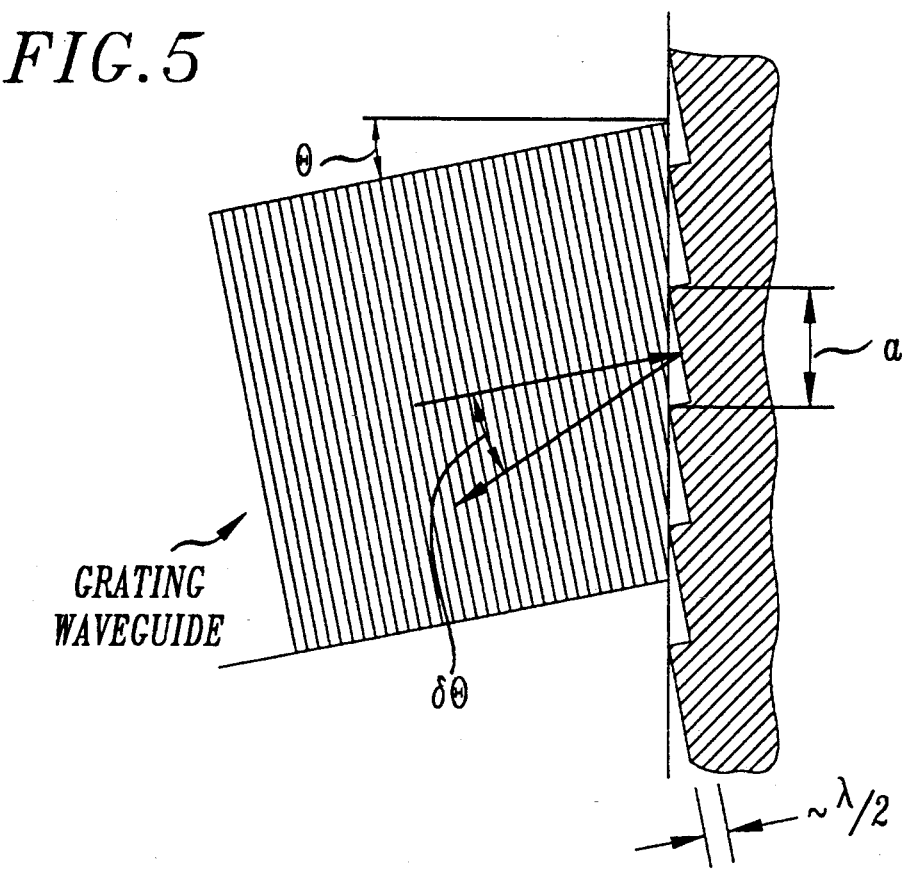
FIG. 5 shows a grating waveguide terminated in a reflective element comprising a diffraction grating which has been separately made and then affixed to one end of the grating waveguide.
Figure 6:
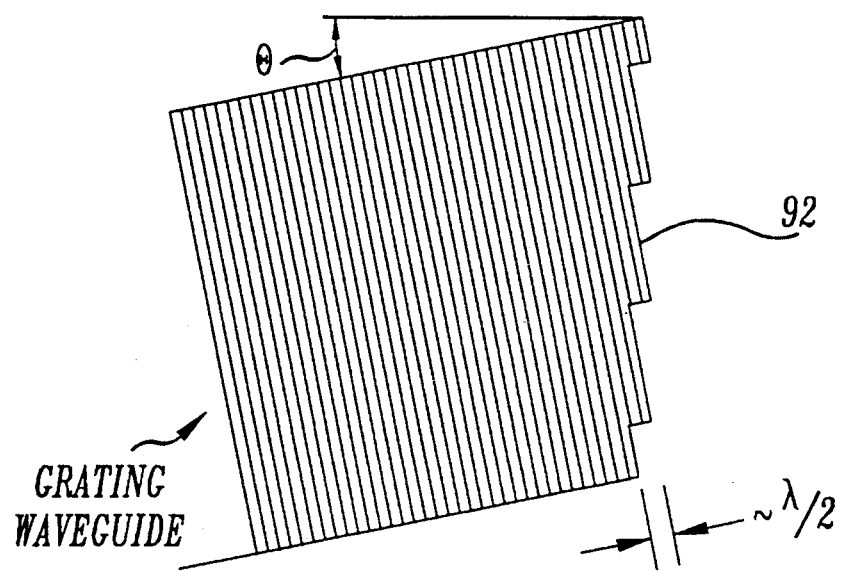
FIG. 6 shows a grating waveguide terminated in a reflective element comprising a diffraction grating which has been directly machined into one end of the grating waveguide.

Configurations using Bragg reflectors may be difficult to realize because of the accuracy with which the Bragg reflectors must be positioned. In this case it may be advantageous to form the reflective elements using a conventional diffraction grating. In the example shown in FIG. 5, the ends of the waveguides in the grating are arranged so that the waveguides are parallel to one another and equally spaced. The edge of the wafer at the ends of the grating waveguides then is cut and polished at an angle $\theta$ with respect to the waveguides as shown in FIG. 5. A separately manufactured diffraction grating 90 may then be attached to the ends of the grating waveguides as shown in FIG. 5. Alternatively, as shown in FIG. 6, the edge of the wafer may be directly machined into the form of an optical diffraction grating 92. The gratings of FIGS. 5 and 6 are preferably configured so that each facet of the grating is illuminated at normal incidence. The depth of each groove should be approximately equal to $\lambda/2$. The latter condition can only be satisfied exactly at one wavelength. At other wavelengths, the angle of reflection will in general differ from the angle of incidence by an amount $\delta\theta$ which will be determined by the angular dispersion of the grating $\delta\theta/\delta\lambda = 1/a\cos\theta_1$. This will result in some loss of efficiency, but the loss will be small, provided the angular aperture of the waveguide is large enough to include all reflected wave directions, for all wavelengths of interest. This condition can be satisfied by properly chosing the waveguide width which is inversely related to the waveguide angular aperture determined by the far field width of the waveguide mode.

One or more of the devices disclosed here may be used to multiplex or demultiplex optical signals produced by equipment in an optical fiber based long haul or local area communications network, such as a local or long distance public switched telephone network, using entirely or, in part, optical fibers or other optical signal transmitting medium and the like to transmit communications signals from place-to-place in the network. Communications systems using optical multiplexers and demultiplexers in accordance with this invention comprise one or more pieces of equipment which produce optical signals for transmission to one or more receivers of the optical signals. The multiplexers and demultiplexers of this invention may be part of the communications path between the equipment which produces the optical signals and the equipment which receives those optical signals.

I claim:

1. An apparatus, comprising:
   a first waveguide;
   a grating comprising a plurality of second waveguides, each of the second waveguides in the grating having two ends and each of the second waveguides in the grating differing in length from each of the other second waveguides in the grating by a predetermined amount;
   a first end of each of the second waveguides being coupled to the first waveguide so that electromagnetic energy flowing in the first waveguide illuminates a plurality of the first ends of the second waveguides in the grating; and
   a reflective element connected to a second end of each of the second waveguides in the grating.

2. The optical apparatus of claim, 1, in which the at least one reflective element comprises a Bragg reflector.

3. The optical apparatus of claim 2, in which each of the second plurality of waveguides is substantially straight.

4. The optical apparatus of claim 1, in which the at least one reflective element comprises an optical diffraction grating attached to an end of at least one of the waveguides in the second plurality of waveguides.

5. The optical apparatus of claim 1 in which the at least one reflective element comprises an optical diffraction grating machined into an end of at least one of the waveguides in the second plurality of waveguides.

6. A method of multiplexing a plurality of optical wavelengths, comprising the steps of:

receiving, in each of a plurality of input waveguides for carrying input optical signals, an optical signal of a predetermined wavelength;

directing, through a free space region, the optical signals received in the plurality of waveguides toward a reflective optical grating comprising a plurality of unequal length waveguides each terminated in a reflective element; and reflecting the optical signals directed to the optical grating toward a single one of a plurality of waveguides for carrying multiplexed optical signals interleaved with the plurality of waveguides for carrying unmultiplexed optical signals.

7. A method of demultiplexing a multiplexed plurality of optical wavelengths, comprising the steps of:

receiving, in one of a plurality of input waveguides for carrying input optical signals, a plurality of multiplexed optical signals;

directing, through a free space region, the input optical signals toward a reflective optical grating comprising a plurality of unequal length waveguides, each terminated in a reflective element; and reflecting each of the multiplexed optical signals from the grating toward a respective one of a plurality of output waveguides for receiving unmultiplexed optical signals interleaved with the plurality of waveguides for carrying multiplexed opticals signals.

8. An apparatus, comprising:
a first plurality of waveguides;
a second plurality of waveguides coupled to the first plurality of waveguides so that electromagnetic energy flowing in at least one of the first plurality of waveguides illuminates a first end of each of the second plurality of waveguides; and
at least one reflective element directly connected to a second end of at least one of the second plurality of waveguides;
in which the first plurality of waveguides comprises a first group of input waveguides and a second group of output waveguides interleaved with the first group of input waveguides.

9. An apparatus, comprising:
a first plurality of waveguides;
a second plurality of waveguides coupled to the first plurality of waveguides so at electromagnetic energy flowing in at least one of the first plurality of waveguides illuminates a first end of each of the second plurality of waveguides; and
a reflective element directly connected to a second end of each of the second plurality of waveguides;
in which the reflective elements each comprises a Bragg reflector; and
in which each of the second plurality waveguides is curved so that each Bragg reflector is displaced with respect to every other Bragg reflector by only linear displacements.

10. An communication system, comprising:
a means for producing one or more optical signals for carrying information from a transmitter to a receiver;
at least one multiplexing/demultiplexing device for receiving the one or more optical signals comprising:
a first plurality of waveguides;
a second plurality of waveguides coupled to the first plurality of waveguides so that electromagnetic energy flowing in at least one of the first plurality of waveguides illuminates a first end of each of the second plurality of waveguides; and
at least one reflective element directly connected to a second end of at least one of the second plurality of waveguides; and
a means for transmitting output signals from the multiplexing/demultiplexing device to a receiver.

* * * * *